(12) United States Patent
Clark

(10) Patent No.: US 10,997,850 B1
(45) Date of Patent: May 4, 2021

(54) SERVICE ANIMAL EMERGENCY ALERT APPARATUS

(71) Applicant: Kira Nichole Clark, Triangle, VA (US)

(72) Inventor: Kira Nichole Clark, Triangle, VA (US)

(*) Notice: Subject to any disclaimer, the term of this patent is extended or adjusted under 35 U.S.C. 154(b) by 0 days.

(21) Appl. No.: 17/247,449

(22) Filed: Dec. 11, 2020

Related U.S. Application Data

(60) Provisional application No. 62/946,730, filed on Dec. 11, 2019.

(51) Int. Cl.
*G08B 25/12* (2006.01)
*A01K 29/00* (2006.01)
*G08B 21/02* (2006.01)

(52) U.S. Cl.
CPC .............. *G08B 25/12* (2013.01); *A01K 29/00* (2013.01); *G08B 21/02* (2013.01)

(58) Field of Classification Search
CPC ...................................................... G08B 25/12
See application file for complete search history.

(56) References Cited

U.S. PATENT DOCUMENTS

| | | | | |
|---|---|---|---|---|
| 5,604,478 A * | 2/1997 | Grady | ................... | A01K 15/02 340/330 |
| 5,901,667 A | 5/1999 | Kailas | | |
| 5,952,926 A * | 9/1999 | Syverson | ................. | G08B 3/10 340/573.3 |
| 6,094,139 A * | 7/2000 | Moore | ................... | A01K 15/02 340/573.1 |
| 6,445,302 B2 * | 9/2002 | Vena | ...................... | A01K 15/02 119/174 |
| 7,057,515 B2 * | 6/2006 | Smith | .................... | A01K 15/02 340/573.1 |
| 10,034,457 B2 * | 7/2018 | Swartz | ................. | A01K 15/021 |
| 10,334,823 B2 * | 7/2019 | Foster | .................. | A01K 15/021 |
| 2009/0051548 A1 * | 2/2009 | Dundon | ................ | A01K 1/035 340/573.3 |
| 2011/0260873 A1 * | 10/2011 | Ouchi | .................. | G08B 25/016 340/573.3 |
| 2012/0312247 A1 * | 12/2012 | Ebersole | ............... | A01K 15/02 119/712 |
| 2013/0052978 A1 * | 2/2013 | Sabin | ................... | A01K 27/009 455/404.1 |

* cited by examiner

*Primary Examiner* — Travis R Hunnings
(74) *Attorney, Agent, or Firm* — Carson Patents®; Gregory D Carson

(57) ABSTRACT

The Service Animal Emergency Alert Apparatus is a device for providing a triggering means to a trained animal to send an alert signal by triggering a remote activation device connectively attached to an alert service, monitored service, or emergency response service comprising a box having a door providing access to an interior of said box wherein a configurable remote device position tray is connectively attached to a plurality of triggering buttons and a triggering pull cord configured to enable a trained animal to send an alert by pushing upon said triggering buttons or grasping and pulling upon said triggering pull cord thereby activating said remote activation device sending an alert signal through an alert service, monitored service, or emergency response service to summon responsive human assistance to render aid.

16 Claims, 3 Drawing Sheets

US 10,997,850 B1

SERVICE ANIMAL EMERGENCY ALERT APPARATUS

TECHNICAL FIELD OF THE INVENTION

The present invention relates generally to a Service Animal Emergency Alert Apparatus in the form of an apparatus and method for a trained service animal to alert healthcare professionals and/or authorities when the animal determines emergency assistance is needed.

BACKGROUND OF THE INVENTION

Many alert devices have been previously developed that may be used by a person to send an alert signal to a base station to call 911 or a monitoring service for emergency assistance. These conventional devices are only designed for use by humans.

However, for customized applications some devices have been developed which allow trained animals to trigger an alert by pulling on a chord or pushing on a button with a trained bite-grasping, and a pulling behavior (act one) in response to a given stimulus or either a trained paw-tapping behavior (act two) or trained nose-tapping behavior (act three) respectively in response to a given stimulus. However, because some animals are or can only be trained to a specific act, these devices are only suited for those certain trained animals having been trained to use that specific trigger type.

Further, because there are no devices available that enable triggering based on all three acts (act one, act two, and act three supra) for trained animals, there is also no standard appearing or universally available apparatus for a trained service animal to trigger an alert.

Therefore, what is needed is a simple device that provides multiple triggering options for trained animals to send an alert signal. Further needed in this simple device is that it can be adapted to enable triggering of various types of alert devices, monitored services, and emergency response services to enable a trained animal to send an alert through any remotely activate-able and/or trigger-able alert devices, monitored services, and emergency response services. Further needed in this simple device is that it be in the form of an universal standard design (shape, color, and appearance) that any appropriately trained service animal could use even upon first visit to an area where such a device were situated and active.

BRIEF DESCRIPTION OF INVENTION

According to a first aspect of the invention, there is a Service Animal Emergency Alert Apparatus for providing a triggering means to a service animal to send an alert signal by triggering an activation device remotely communicable with an alert service, comprising the following: a box having an entrance for said service animal to an interior of said box wherein said activation device comprises a position tray connected to a triggering button and a triggering pull cord configured to enable said trained animal to send said alert signal by pushing upon said triggering button or pulling upon said triggering pull cord thereby sending said alert signal through said alert service to human assistance to render aid.

According to a second aspect of the invention, there is a Service Animal Emergency Alert Apparatus for providing a triggering means to a service animal to send an alert signal by triggering an activation device remotely communicable with an alert service, comprising the following: a box having an entrance for said service animal to an interior of said box wherein said activation device comprises a position tray connected to a first triggering button, a second triggering button, and a triggering pull cord configured to enable said trained animal to send said alert signal by pushing upon said first triggering button or pulling upon said triggering pull cord thereby sending said alert signal through said alert service to human assistance to render aid.

According to a third aspect of the invention, there is a Service Animal Emergency Alert Apparatus, wherein the entrance comprises a door openable by the service animal, and configured to enable said trained animal to send said alert signal by pushing or pulling upon said door.

According to a fourth aspect of the invention, there is a Service Animal Emergency Alert Apparatus, wherein said first triggering button and said second triggering button are configured to enable said service animal to activate said triggering button with a paw-tapping act or a nose-tapping act.

According to a fifth aspect of the invention, there is a Service Animal Emergency Alert Apparatus, wherein said triggering pull cord is configured to enable said service animal to activate said triggering pull cord with a bite, grasp, and pull act.

According to a sixth aspect of the invention, there is a Service Animal Emergency Alert Apparatus, wherein said position tray is configured to enable activation of a service specific remote activation device.

According to a seventh aspect of the invention, there is a Service Animal Emergency Alert Apparatus, wherein said position tray is configured to enable activation of an automated or programmed response of a reliable automated or robotic process.

According to an eighth aspect of the invention, there is a Service Animal Emergency Alert Apparatus for providing a triggering means to a trained animal to send an alert signal by triggering a remote activation device connectively attached to an alert service, monitored service, or emergency response service comprising a box having a door providing access to an interior of said box wherein a remote device position tray is connectively attached to a plurality of triggering buttons, and a triggering pull cord is configured to enable a trained animal to send an alert by pushing upon said triggering buttons or grasping and pulling upon said triggering pull cord thereby activating said remote activation device sending an alert signal through an alert service, monitored service, or emergency response service to summon responsive human assistance to render aid.

According to a ninth aspect of the invention, there is a Service Animal Emergency Alert Apparatus, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal.

According to a tenth aspect of the invention, there is a Service Animal Emergency Alert Apparatus, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal, and further wherein said remote device position tray is configured to enable activation of a service specific remote activating device for an alert service, a monitored service, or an emergency response service to render responsive human assistance when called.

According to an eleventh aspect of the invention, there is a Service Animal Emergency Alert Apparatus, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal, and further wherein said remote device position tray is configured to enable activation of an automated or programmed response of a reliable automated or robotic process.

An advantage of the Service Animal Emergency Alert Apparatus is that it enables the assistance of a trained animal to summon responsive human assistance to render aid during times of emergent need by an owner/operator of said trained animal using standard animal training techniques.

These and/or other aspects of the present general inventive concept will become apparent and more readily appreciated from the following description of the embodiments, taken in con-junction with the accompanying drawings in which:

BRIEF DESCRIPTIONS OF THE DRAWINGS

DETAILED DESCRIPTION

Figure 1:
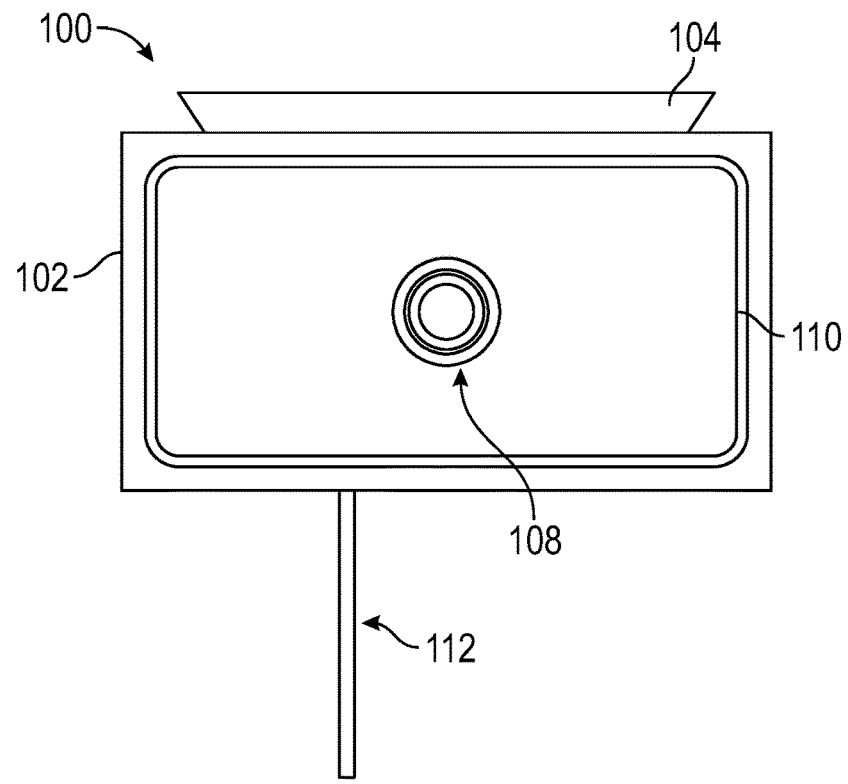
FIG. 1 illustrates a front view of a service animal emergency alert apparatus according to an exemplary embodiment of the present general inventive concept.

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 2:
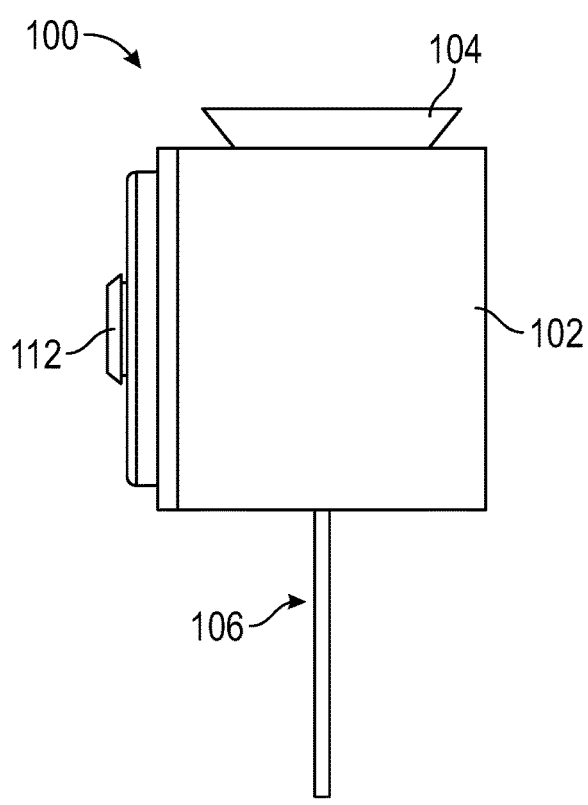
FIG. 2 is a side view of the service animal emergency alert apparatus illustrated in FIG. 1.
Figure 3:
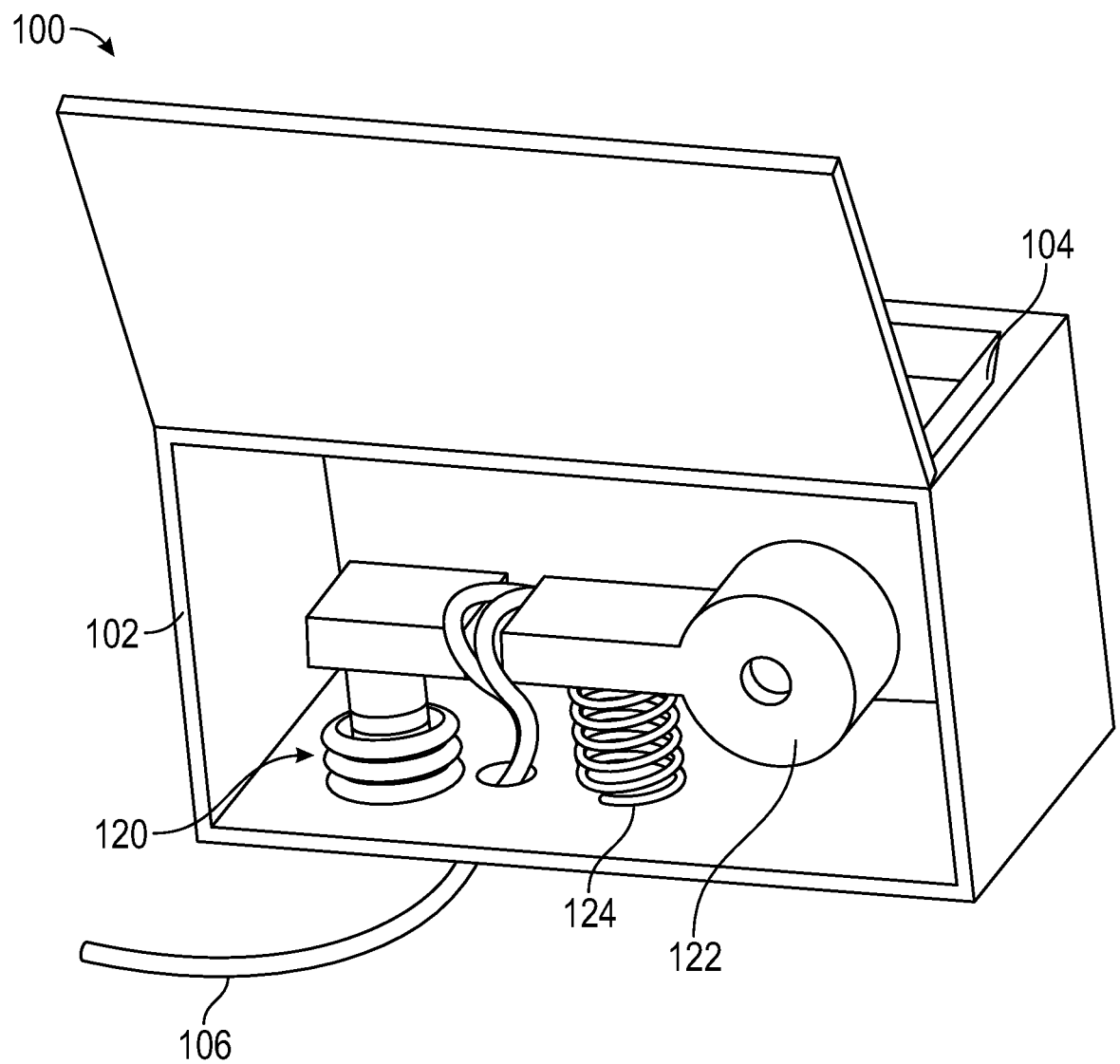
FIG. 3 is a back view of the service animal emergency alert apparatus illustrated in FIG. 1.
Figure 4:
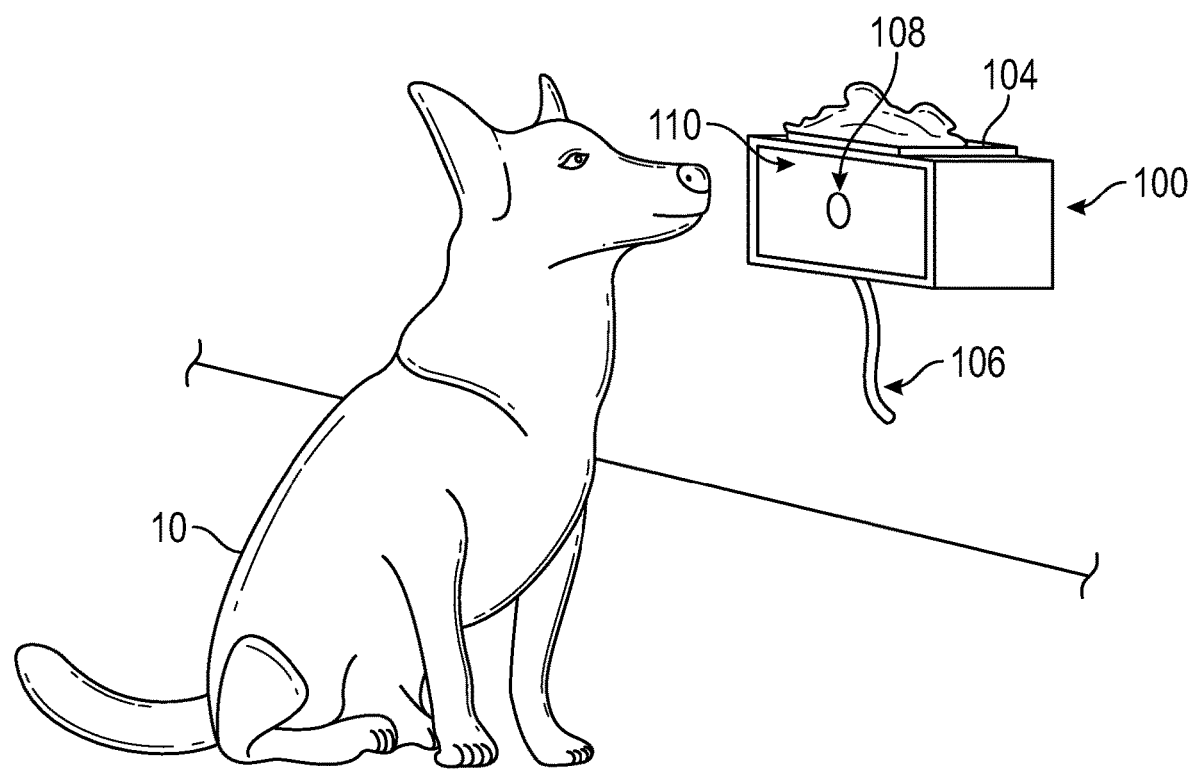
FIG. 4 is a front perspective view of a service animal emergency alert apparatus with a service animal according to an embodiment of the present inventive concept.

FIG. 1 illustrates a front view of a service animal emergency alert apparatus 100 according to an exemplary embodiment of the present general inventive concept. FIG. 2 is a side view of the service animal emergency alert apparatus 100 illustrated in FIG. 1. FIG. 3 is a back view of the service animal emergency alert apparatus 100 illustrated in FIG. 1.

Referring to FIGS. 1 through 3, the service animal emergency alert apparatus, designated generally as 100, is illustrated. In the present embodiment, the service animal emergency alert apparatus 100 is designed and configured to allow a trained animal to trigger and send an alert signal to a base station to call 911 or a particular monitoring service for emergency assistance using a multiple mechanism system in a single device. That is, the service animal emergency alert apparatus 100 is designed to let a trained animal pull a chord, push a first button with his/her nose, or push a second button with his/her paws to send an alert signal.

In the present embodiment, the service animal emergency alert apparatus 100 includes a housing 102, a treat tray 104 disposed on top of the housing 102, a pull chord alert activation 106, a first button alert activation 108, and a second button alert activation 110. However, the present general inventive concept is not limited thereto.

In exemplary embodiments, an emergency alert button is placed within housing 102 and is triggered when a trained animal 10 either pulls the pull chord alert activation 106 or pushes the first or second alert activation buttons 108, 110.

The service animal emergency alert apparatus 100 is designed to have multiple mechanisms to trigger the alert signal functioning at the same time. That is, the trained animal 10 can choose any of the methods to trigger that said animal is trained to trigger in order to send an emergency alert signal using the alert button 120 to alert healthcare professionals and/or authorities when the animal determines emergency assistance is needed.

In the present embodiment, when the trained animal 10 pulls the pull chord alert activation 106, a hammer 122 is pulled downward and presses the alert button 120. A spring 124 is positioned to return the hammer 122 to its original position. However, the present inventive concept is not limited thereto. That is, in alternate embodiments, the service animal emergency alert apparatus 100 may further include replaceable insert trays which precisely align the hammer 122 with various alert buttons 120 for different companies.

In the present embodiment, when the trained animal 10 pushes the first or second alert activation buttons 108, 110, a mechanism (not illustrated) presses a second alert button to alert healthcare professionals and/or authorities, when the animal determines emergency assistance is needed.

In alternative embodiments, when the trained animal 10 pulls the pull chord alert activation 106 or pushes the first or second activation buttons 108, 110, a mechanism 122, 124 presses an alert button to send an alert signal to a plurality of wireless devices including, but not limited to, a watch, a smartphone, a tablet, a computer, or the like.

In yet further alternative embodiments, when the trained animal 10 pushes a remote device (not shown) consisting of a simple button, a mechanism 122, 124 according to the present invention, presses an alert button to send an alert signal to a plurality of wireless devices including, but not limited to, a watch, a smartphone, a tablet, a computer, or the like to alert healthcare professionals and/or authorities, when the animal determines emergency assistance is needed.

In a preferred embodiment of the present invention, there is a Service Animal Emergency Alert Apparatus for providing a triggering means to a service animal to send an alert signal by triggering an activation device remotely communicable with an alert service, comprising the following: a box having an entrance for said service animal to an interior of said box wherein said activation device comprises a position tray connected to a triggering button and a triggering pull cord configured to enable said trained animal to send said alert signal by pushing upon said triggering button or pulling upon said triggering pull cord thereby sending said alert signal through said alert service to human assistance to render aid.

In an embodiment of the present invention, there is a Service Animal Emergency Alert Apparatus for providing a triggering means to a service animal to send an alert signal by triggering an activation device remotely communicable with an alert service, comprising the following: a box having an entrance for said service animal to an interior of said box wherein said activation device comprises a position tray connected to a first triggering button, a second triggering button, and a triggering pull cord configured to enable said trained animal to send said alert signal by pushing upon said triggering buttons or pulling upon said triggering pull cord thereby sending said alert signal through said alert service to human assistance to render aid.

In an embodiment of the invention, there is a Service Animal Emergency Alert Apparatus, wherein the entrance comprises a door openable by the service animal, and configured to enable said trained animal to send said alert signal by pushing or pulling upon said door.

In an embodiment of the invention, there is a Service Animal Emergency Alert Apparatus, wherein said first triggering button, and said second triggering button are configured to enable said service animal to activate said triggering button with a paw-tapping act or a nose-tapping act.

In a preferred embodiment of the invention, there is a Service Animal Emergency Alert Apparatus, wherein said triggering pull cord is configured to enable said service animal to activate said triggering pull cord with a bite, grasp, and pull act.

In an embodiment of the invention, there is a Service Animal Emergency Alert Apparatus, wherein said position tray is configured to enable activation of a service specific remote activation device.

In an embodiment of the invention, there is a Service Animal Emergency Alert Apparatus, wherein said position tray is configured to enable activation of an automated or programmed response of a reliable automated or robotic process.

In an embodiment of the invention, there is a Service Animal Emergency Alert Apparatus for providing a triggering means to a trained animal to send an alert signal by triggering a remote activation device connectively attached to an alert service, monitored service, or emergency response service comprising a box having a door providing access to an interior of said box wherein a remote device position tray is connectively attached to a plurality of triggering buttons, and a triggering pull cord configured to enable a trained animal to send an alert by pushing upon said triggering buttons or grasping and pulling upon said triggering pull cord thereby activating said remote activation device sending an alert signal through an alert service, monitored service, or emergency response service to summon responsive human assistance to render aid.

In an embodiment of the invention, there is a Service Animal Emergency Alert Apparatus, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal.

In an embodiment of the invention, there is a Service Animal Emergency Alert Apparatus, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal, and further wherein said remote device position tray is configured to enable activation of a service specific remote activating device for an alert service, a monitored service, or an emergency response service to render responsive human assistance when called.

In an embodiment of the invention, there is a Service Animal Emergency Alert Apparatus, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal, and further wherein said remote device position tray is configured to enable activation of an automated or programmed response of a reliable automated or robotic process.

In an alternative embodiment, the apparatus of the present invention can be adapted to enable triggering of various types of alert devices, monitored services, and emergency response services to enable a trained animal to send an alert through any remotely activate-able and/or trigger-able alert devices, monitored services, and emergency response services.

In an alternative embodiment, the apparatus of the present invention can be in the form of an universal standard design (shape, color, and appearance) that any appropriately trained service animal could use even upon first visit to an area where such a device were situated and active.

An advantage of the Service Animal Emergency Alert Apparatus is that it enables the assistance of a trained animal to summon responsive human assistance to render aid during times of emergent need by an owner/operator of said trained animal using standard animal training techniques.

An advantage of the Service Animal Emergency Alert Apparatus is that it enables the assistance of a trained animal to summon responsive human assistance to render aid during times of emergent need by an owner/operator of said trained animal. Summoning responsive human assistance to render aid may be, but is not limited to, any of the following: calling an emergency response phone number and sending an alert signal, calling a monitored service with the capacity to come to the area where the Service Animal Emergency Alert Apparatus is installed, sending an alert to an audio and/or video announcement device.

An alert signal may be, but is not limited to, any of the following: a tone, text message, recorded audio message, or recorded video message, live audio message, or live video message. Said alert signal may be, but is not limited to, any particular signaling or communications technology. By the current usual convention, an alert signal is a call to 9-1-1, or other similarly equipped human manned response agency or service.

Configuring the apparatus of the present invention to accommodate the activation of a remote control device that is connected with an alert, monitored, or emergency response system is accomplished by customizing a remote-control device holding plate contained within the apparatus of the present invention. This customizable plate holds said remote-control device in place under an activation element that is moved (triggered) when an animal triggers a button or pulls a cord of the apparatus to perform the behavior the animal learns to complete when a cue is observed by said animal. Either one or two buttons and a cord that can be used by an animal are connectively attached to the activation element to trigger and/or activate the remote control and thereby call any phone number or system available that has a remote control device and thus enable an animal to place an emergency response call and summon responsive human help. For example, the animal could call 9-1-1, an emergency medical response service, or any person with a phone.

The animal interface apparatus of the present invention has, not less than, the three obvious ways wherein an animal may trigger an alert signal. An animal may pull the cord, or press one of the buttons to activate (trigger) a remote control activation device for an emergency response service. An animal may use a paw to tap, a nose to tap, or a tail to tap a button of the present invention and thereby trigger the activation of a remote control device. An animal may use teeth and jaws, and/or combinations of paws, arms, or legs of said animal to grasp and pull a cord of the present invention and thereby trigger the activation of a remote control device. Animals will require familiarization and training to enable them to trigger an alert or alarm thereby summoning aid.

The usual animal training methods are used to train an animal to push a button or pull a cord in response to a cue. The cue can be any human act that would require or precipitate a need for responsive human assistance, or an automated or programmed response of a reliable automated or robotic process. Animals are familiarized with the apparatus of the present invention and taught to push the button and/or pull the cord. Animals are familiarized with cue and taught to operate by pushing the button and/or pulling the cord in response to the cue.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A Service Animal Emergency Alert Apparatus for providing a triggering means to a service animal to send an alert signal by triggering an activation device remotely communicable with an alert service, comprising the following: a box having an entrance for said service animal to an interior of said box wherein said activation device comprises a position tray connected to a triggering button and a triggering pull cord configured to enable said trained animal to send said alert signal by pushing upon said first triggering button or pulling upon said triggering pull cord thereby sending said alert signal through said alert service to human assistance to render aid.

2. The apparatus of claim 1, wherein the entrance comprises a door openable by the service animal, and configured to enable said trained animal to send said alert signal by pushing or pulling upon said door.

3. The apparatus of claim 1, wherein said triggering button is configured to enable said service animal to activate said triggering button with a paw-tapping act or a nose-tapping act.

4. The apparatus of claim 1, wherein said triggering pull cord is configured to enable said service animal to activate said triggering pull cord with a bite, grasp, and pull act.

5. The apparatus of claim 1, wherein said position tray is configured to enable activation of a service specific remote activation device.

6. The apparatus of claim 1, wherein said position tray is configured to enable activation of an automated or programmed response of a reliable automated or robotic process.

7. A Service Animal Emergency Alert Apparatus for providing a triggering means to a service animal to send an alert signal by triggering an activation device remotely communicable with an alert service comprising the following: a box having an entrance for said service animal to an interior of said box wherein said activation device comprises a position tray connected to a first triggering button, a second triggering button, and a triggering pull cord configured to enable said trained animal to send said alert signal by pushing upon said first triggering button or pulling upon said triggering pull cord thereby sending said alert signal through said alert service to human assistance to render aid.

8. The apparatus of claim 7, wherein the entrance comprises a door openable by the service animal, and configured to enable said trained animal to send said alert signal by pushing or pulling upon said door.

9. The apparatus of claim 7, wherein said first triggering button and said second triggering button are configured to enable said service animal to activate said triggering buttons with a paw-tapping act or a nose-tapping act.

10. The apparatus of claim 7, wherein said triggering pull cord is configured to enable said service animal to activate said triggering pull cord with a bite, grasp, and pull act.

11. The apparatus of claim 7, wherein said position tray is configured to enable activation of a service specific remote activation device.

12. The apparatus of claim 7, wherein said position tray is configured to enable activation of an automated or programmed response of a reliable automated or robotic process.

13. A Service Animal Emergency Alert Apparatus for providing a triggering means to a trained animal to send an alert signal by triggering a remote activation device connectively attached to an alert service, monitored service, or emergency response service comprising a box having a door providing access to an interior of said box wherein a remote device position tray is connectively attached to a plurality of triggering buttons, and a triggering pull cord configured to enable a trained animal to send an alert by pushing upon said triggering buttons or grasping and pulling upon said triggering pull cord thereby activating said remote activation device sending an alert signal through an alert service, monitored service or emergency response service to summon responsive human assistance to render aid.

14. The apparatus of claim 13, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal.

15. The apparatus of claim 13, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal, and further wherein said remote device position tray is configured to enable activation of a service specific remote activating device for an alert service, a monitored service, or an emergency response service to render responsive human assistance when called.

16. The apparatus of claim 13, wherein said triggering buttons and said triggering pull cord are configured to enable a trained service animal to activate said triggering buttons with a paw-tapping act or a nose-tapping act by said trained service animal, and wherein said triggering pull cord is configured to enable a trained service animal to activate said triggering pull cord with a bite, grasp, and pull act by said trained service animal, and further wherein said remote device position tray is configured to enable activation of an automated or programmed response of a reliable automated or robotic process.

\* \* \* \* \*